Nov. 3 1925.  1,559,733
W. R. BARGER ET AL
APPARATUS FOR THE TREATMENT OF FRUIT WITH
ANTISEPTICS FOR THE PREVENTION OF DECAY
Filed Feb. 21, 1925

*Joint Inventors*
William R. Barger
William C. Huckill
Dr. A. Hawkins

Patented Nov. 3, 1925.

1,559,733

UNITED STATES PATENT OFFICE.

WILLIAM R. BARGER, WILLIAM V. HUKILL, AND LON A. HAWKINS, OF WASHINGTON, DISTRICT OF COLUMBIA, DEDICATED, BY MESNE ASSIGNMENTS, TO THE CITIZENS OF THE UNITED STATES.

APPARATUS FOR THE TREATMENT OF FRUIT WITH ANTISEPTICS FOR THE PREVENTION OF DECAY.

Application filed February 21, 1925. Serial No. 10,971.

(GRANTED UNDER THE ACT OF MARCH 3, 1883; 22 STAT. L. 625.)

*To all whom it may concern:*

Be it known that we, WILLIAM R. BARGER, WILLIAM V. HUKILL, and LON A. HAWKINS, citizens of the United States of America, and employees of the United States Department of Agriculture, residing at Washington, D. C., have invented a new and useful Apparatus for the Treatment of Fruit with Antiseptics for the Prevention of Decay, of which the following is a specification.

This application is made under the act of March 3, 1883, chapter 143 (22 Stat. 625) and the invention herein described and claimed may be used by the Government of the United States or any of its officers or employees in the prosecution of work for the Government, or any person in the United States, without payment to us of any royalty thereon.

The invention is shown in the accompanying drawing consisting of 4 figures in which Figure 1 represents a plan view of the entire apparatus.

Figure 1:
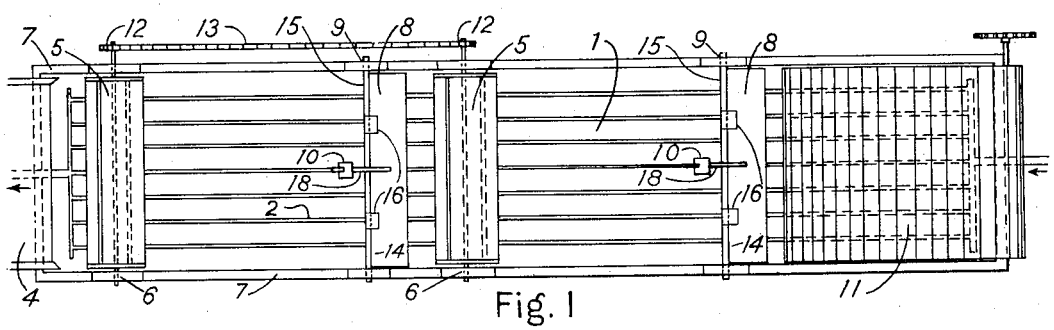
Figure 2:
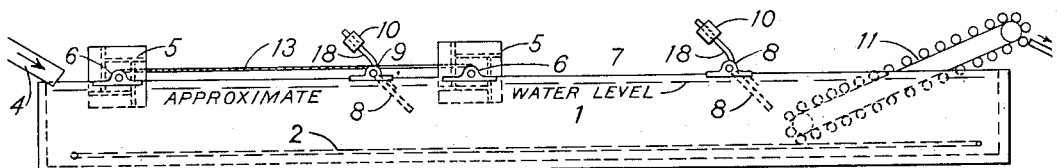
Figure 2 represents a side elevation in section of the apparatus.
Figure 3:
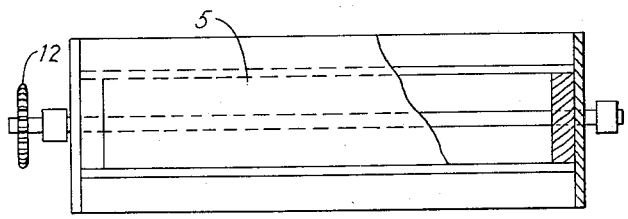
Figure 3 represents a paddle wheel which is a part of the apparatus.
Figure 4:
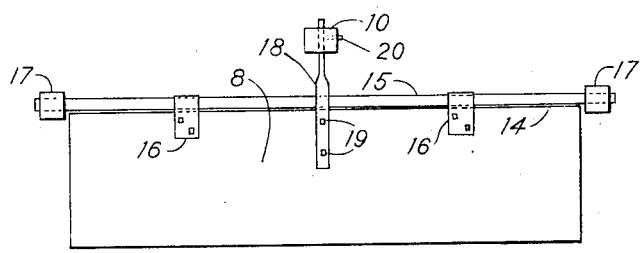
Figure 4 represents a baffle which is also a part of the apparatus.

The apparatus consists of a tank 1 constructed of suitable materials such as galvanized iron, and having dimensions depending upon the amount of fruit to be put through it in a given time, which is adapted to receive an antiseptic such as a solution of borax, in which the fruit is to be submerged. This solution is heated by a steam coil 2 of sufficient capacity to raise the temperature of the solution in the tank from 60° to 120° in one-half hour. This steam coil 2 is placed in the bottom 3 of the tank 1 and may extend throughout the entire length of the tank. Steam is supplied to the coil 2 in any conventional manner. The tank 1 is equipped with a gravity feed chute 4 for delivering the fruit to the tank 1; two revolving paddle wheels 5 held in place by bearings 6 bolted to the sides 7 of the tank 1 for submerging the fruit in the solution; two baffles 8 suspended from bearings 9 bolted to the sides 7 of the tank 1 and equipped with counter-weights 10 for regulating the speed of the fruit through the tank and thus determining the length of time the fruit is held in the solution; and an elevator 11 operated by a motor (not shown) or other suitable means, for removing the fruit from the tank after the same has been treated with the antiseptic. The paddle wheels 5 are equipped with sprockets 12, a chain 13 extending between said sprockets and motion is imparted thereto by any desired means (not shown). The baffles 8 are made of boards at the upper edges 14 of which are affixed rods 15 by means of clamps 16, nuts 17 being attached to the ends of the rods 15 so as to hold the baffles 8 in position in bearing 9. The counter-weights 10 are supported by bent arms 18 which are in turn attached by rivets 19 to the upper edges 14 of the baffles 8. The counter-weights 10 are adjustable to any desired position on the arms 18, a set-screw 20 being employed for this purpose.

Operation.—In actual operation the fruit is fed into the tank 1 at one end through the gravity feed chute 4 and is immediately submerged by one of the paddle wheels 5, passes on to one of the baffles 8 and is held there until the fruit is several layers deep across the tank 1 or until it develops sufficient pressure to tilt the baffle 8 so that the lower layers of oranges may pass thereunder. The fruit passing into the tank 1 over the gravity chute 4 is moved along by the paddle wheel 5 until it reaches the first baffle board 8; it remains there until the pressure of the fruit from the rear is sufficient to overcome the resistance of the baffle board 8, together with its counter-weight 10, when it tips the baffle board and passes beneath it in turn to be moved forward by the second paddle wheel 5, when the process is repeated until the fruit is forced beneath the second baffle board 8 where it reaches the elevator 11 which delivers it to the drier (not shown). The rate at which the oranges pass through the tank 1, and the length of time they remain in the solution, is thus regulated by the rate at which they are fed into the tank and the position of the counter-weights 10 on the baffles 8.

We claim:

An apparatus intended for use in treating fruit with antiseptics, comprising a tank, containing an antiseptic solution, a chute for feeding the fruit to be treated into said tank, a steam coil in said tank for heating the antiseptic solution, paddle wheels in said tank for submerging the fruit in the solution, and, adjacent to said paddle wheels, baffles adapted to control the speed of the movement of the fruit throughout the length of the tank, and an elevator at the opposite end of the tank from the aforesaid chute adapted for the removal of the fruit from the tank.

WILLIAM R. BARGER.
WILLIAM V. HUKILL.
LON A. HAWKINS.